United States Patent
Manteiga et al.

(10) Patent No.: US 6,296,203 B1
(45) Date of Patent: Oct. 2, 2001

(54) SNUBBER THRUST MOUNT

(75) Inventors: John Alan Manteiga, North Andover; Christopher James Wilusz, Peabody, both of MA (US); Cornelius Harm Dykhuizen, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/578,120

(22) Filed: May 24, 2000

(51) Int. Cl.[7] .................................................. B64D 27/26
(52) U.S. Cl. ............................ 244/54; 248/554; 60/39.31
(58) Field of Search ................................ 244/17.27, 54; 248/554–557, 637, 638; 267/141; 60/39.31

(56) References Cited

U.S. PATENT DOCUMENTS

| | | | |
|---|---|---|---|
| 4,854,525 | * | 8/1989 | Chee ........................................ 244/54 |
| 5,303,880 | * | 4/1994 | Cencula et al. ........................ 244/54 |
| 5,320,307 | | 6/1994 | Spofford et al. . |
| 5,351,930 | * | 10/1994 | Gwinn et al. ........................... 244/54 |

* cited by examiner

Primary Examiner—Galen L. Barefoot
(74) Attorney, Agent, or Firm—Andrew C. Hess; Nathan D. Herkamp

(57) ABSTRACT

A thrust mount includes a platform mountable to an aircraft pylon, and includes end clevises and a center clevis therebetween. An equalizer lever includes opposite ends, and a center therebetween pivotally joined to the center clevis. Thrust links are pivotally joined to the lever ends. And, a pair of elastomeric snubbers are disposed adjacent respective ends of the lever inside the end clevises in frictional abutment therebetween.

20 Claims, 5 Drawing Sheets

SNUBBER THRUST MOUNT

BACKGROUND OF THE INVENTION

The present invention relates generally to gas turbine engines, and, more specifically, to thrust mounts therefor for mounting the engine to an aircraft pylon.

A turbofan gas turbine engine is mounted to an aircraft at corresponding pylons either on the wing or tail sections thereof. Engine mounts may take various forms and must include the capability for carrying thrust loads between the engine and aircraft.

Since size and weight are fundamental constraints in an aircraft application, the engine mounts must be relatively compact and relatively light weight, yet provide suitable strength and longevity for carrying the substantial thrust loads over a useful life in the operation of the aircraft.

Since the engine includes rotor components, it is a source of vibratory excitation typically represented by the operating speed of the engine expressed in 1/revolution, or simply 1/rev. Engine vibratory design must ensure that the various resonant frequencies of the various components of the engine have sufficient margins from the 1/rev excitation frequencies to reduce or minimize 1/rev excitation thereof. Excessive vibratory excitation may result in the accumulation of high cycle fatigue (HCF) which limits the useful life of the corresponding components subject to forced excitation. Vibration may also produce wear and repetitive impact damage at component joints.

Since the engine mounts support the engine, they are subject to vibratory excitation therefrom due to the 1/rev operating speeds. Typical engine mount components are relatively short and rigid and have relatively high resonant frequencies which typically provide large margins with the 1/rev excitation frequencies of the engine.

An exemplary aircraft engine thrust mount is disclosed is U.S. Pat. No. 5,320,307, assigned to the present assignee, which includes a pair of thrust links for carrying thrust load between the engine and aircraft pylon. The outer ends of the thrust links are pivotally joined to an equalizer beam or lever, commonly referred to as a whiffle tree, which is pivotally mounted at its center to the platform supported by the aircraft pylon.

Thrust loads generated during forward propulsion of the aircraft or during thrust reversal operation of the engine during landing are carried through the thrust links between the engine and pylon, with the equalizer beam pivoting slightly at its center to ensure substantially equal thrust loads being carried by the two links.

This thrust mount is relatively compact with a relatively short equalizer lever resulting in a narrow width thrust mount. Correspondingly, this mount has relatively high resonant frequencies providing substantial margins with the 1/rev excitation frequencies of the engine, with little or no HCF accumulation over its useful life.

However, in a recent development effort for another aircraft engine application, the equalizer lever must be relatively long which correspondingly increases the overall elastic flexibility thereof, and increases the overall width of the thrust mount. Correspondingly, low order resonant frequencies of such a long and slender mount system substantially reduce the operating margins with the 1/rev operating speeds of the engine, and thusly contribute to an increased opportunity for HCF damage which could reduce the useful life of the mount.

Accordingly, it is desired to provide a thrust mount configured for accommodating equalizer lever flexibility for minimizing vibratory damage or wear therefrom.

BRIEF SUMMARY OF THE INVENTION

A thrust mount includes a platform mountable to an aircraft pylon, and includes end clevises and a center clevis therebetween. An equalizer lever includes opposite ends, and a center therebetween pivotally joined to the center clevis. Thrust links are pivotally joined to the lever ends. And, a pair of elastomeric snubbers are disposed adjacent respective ends of the lever inside the end clevises in frictional abutment therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
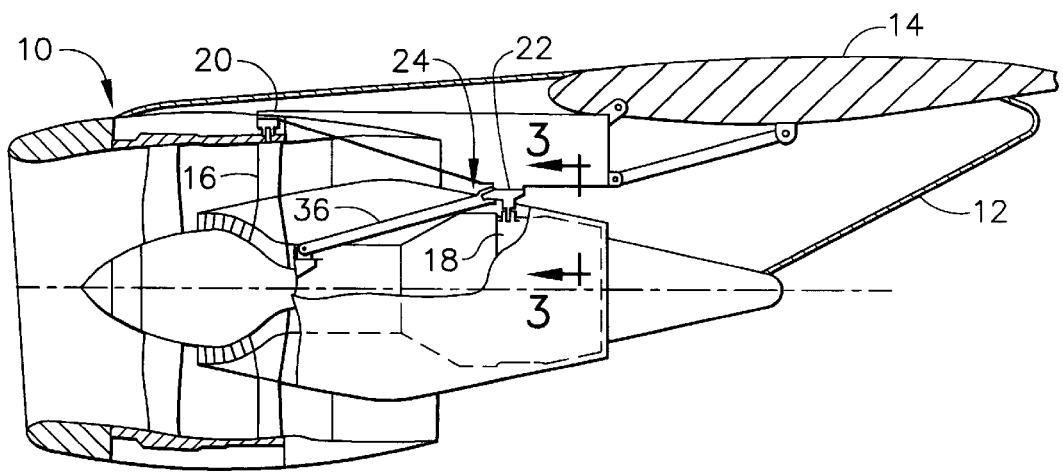
FIG. 1 is a side elevational view, partly in section, of an exemplary turbofan gas turbine engine mounted to an aircraft wing in accordance with an exemplary embodiment.

Illustrated in FIG. 1 is an exemplary turbofan gas turbine engine 10 mounted to a pylon 12 in a aircraft, shown in part. The pylon is typically suspended from a wing 14 of the aircraft for wing mounting the engine in a typical application.

The engine may have any conventional configuration and typically includes a fan driven by a low pressure turbine, with high pressure compressor pressurizing air which is mixed with fuel and ignited in a combustor for generating hot combustion gases which flow downstream through a high pressure turbine which extracts energy therefrom for powering the compressor. The fan compressor and turbines include rotating blades having an operational rotating speed typically expressed in 1/rev, which is a source of vibratory excitation in the engine.

The engine includes a fan frame 16 and rear frame 18 which are rigid structural members for mounting the engine to the pylon.

The engine mounting system may include a front mount 20 supporting the front frame, and an aft mount 22 supporting the rear frame which have any conventional configuration.

In accordance with the present invention, the engine also includes a thrust mount 24 which is configured for carrying engine thrust loads from the fan frame 16 to the pylon in conjunction with the aft mount 22 in an exemplary configuration.

Figure 2:
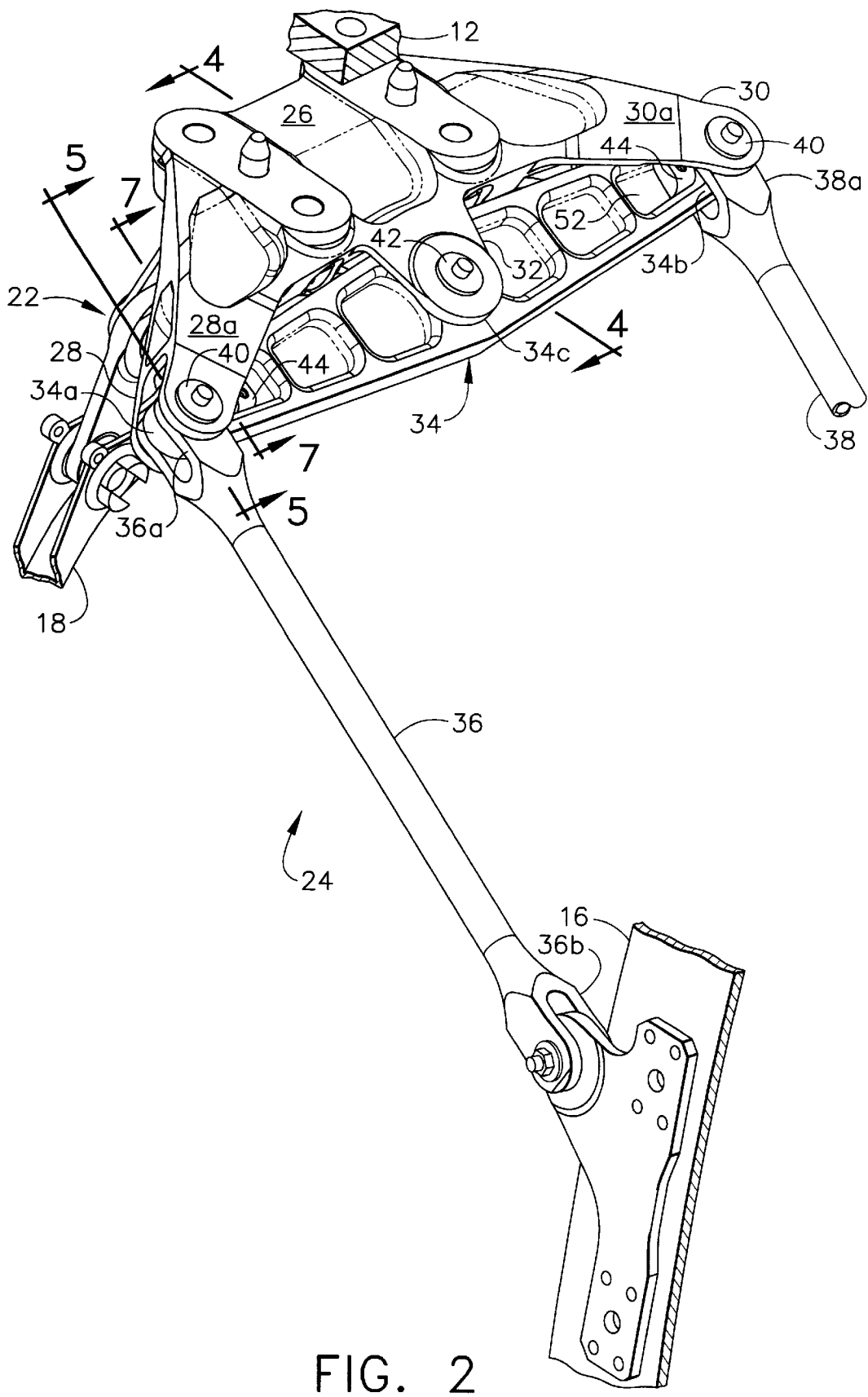
FIG. 2 is an isometric view of a portion of the thrust mount illustrated in FIG. 1 in accordance with an exemplary embodiment of the present invention.

The thrust mount 24 is illustrated in more detail in FIG. 2. The thrust mount includes a rigid platform 26 which is suitably configured for being fixedly mounted to the pylon 12, typically using pins and fasteners. The platform 26 also includes first and second laterally or circumferentially spaced apart end clevises 28,30, and a center clevis 32 therebetween.

An equalizer beam or lever 34 includes first and second opposite ends 34a,b and a center 34c therebetween.

The first and second thrust links 36,38 are in the exemplary form of long hollow tubes have respective outer ends 36a,38a pivotally joined to respective ones of the lever ends 34a,34b. The thrust links also include inner ends, such as 36b, pivotally mounted to the fan frame 16 of the engine.

The general configuration and operation of the thrust mount 24 is conventional as described in U.S. Pat. No. 5,320,307, incorporated herein by reference. More specifically, the equalizer lever 34 illustrated in FIG. 2 extends in length typically as a straight beam in the circumferential direction at the top of the engine radially outwardly of the rear frame 18. The two ends of the lever are mounted inside the respective end clevises 28,30 to provide failsafe operation using respective failsafe joints 40. The center of the lever is mounted inside the center clevis 32 using a center joint 42 having a bushing mounted pin or fastener extending therethrough.

Figure 3:
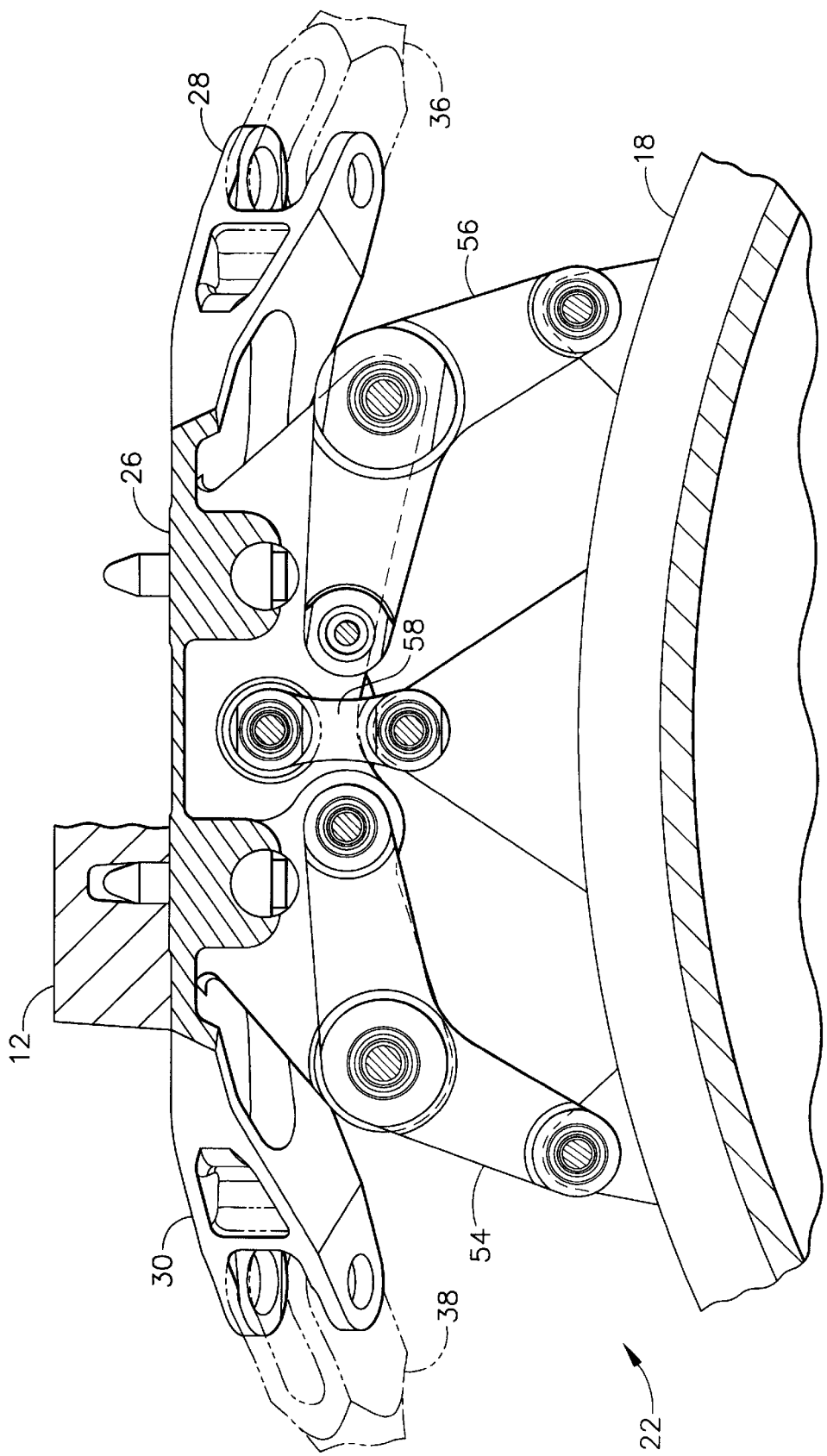
FIG. 3 is an elevational end view, partly in section, of the aft mount illustrated in FIG. 1 and taken generally along line 3—3.
Figure 4:
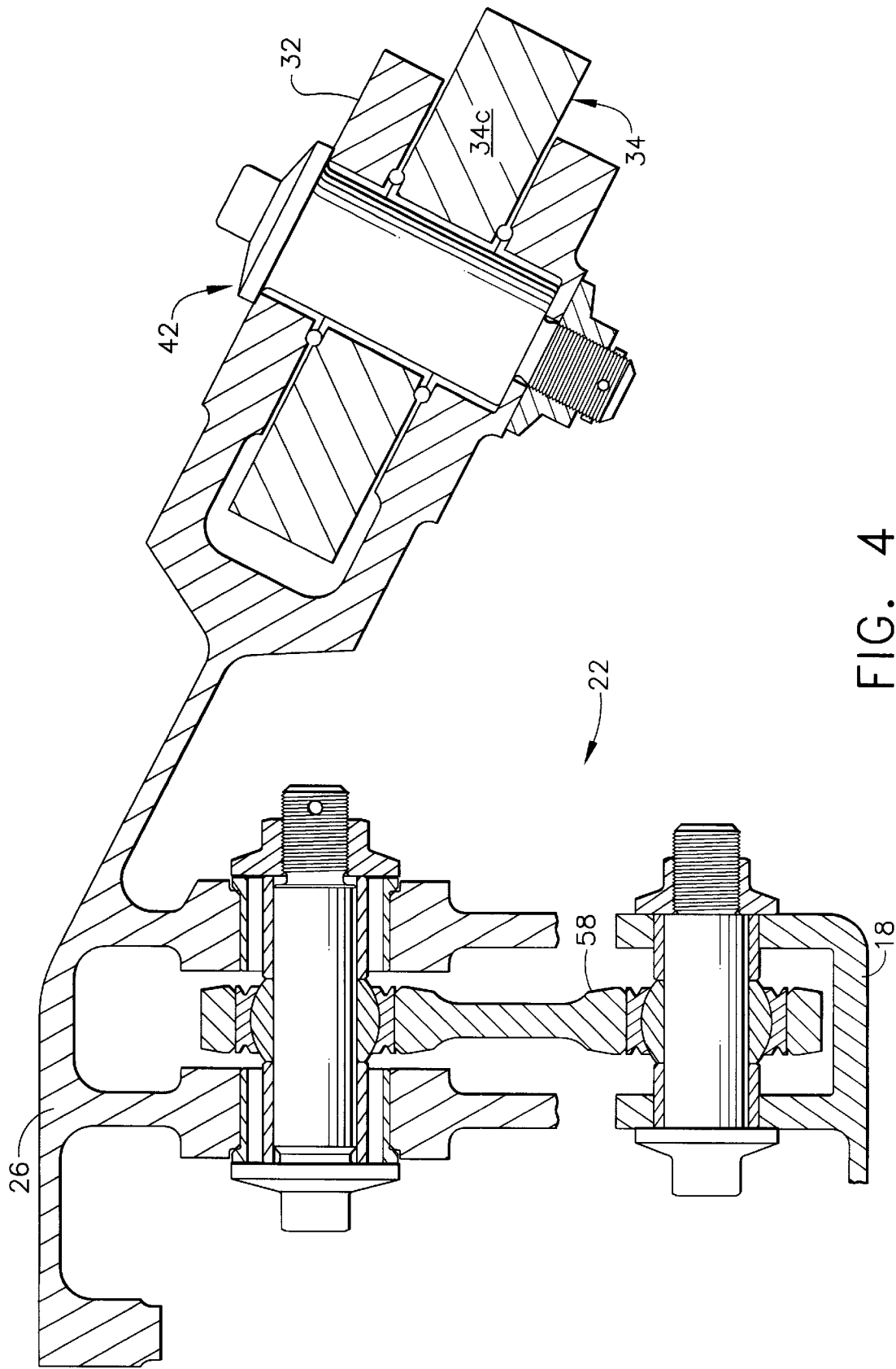
FIG. 4 is a sectional view of the aft mount illustrated in FIG. 2 and taken along line 4—4.
Figure 6:
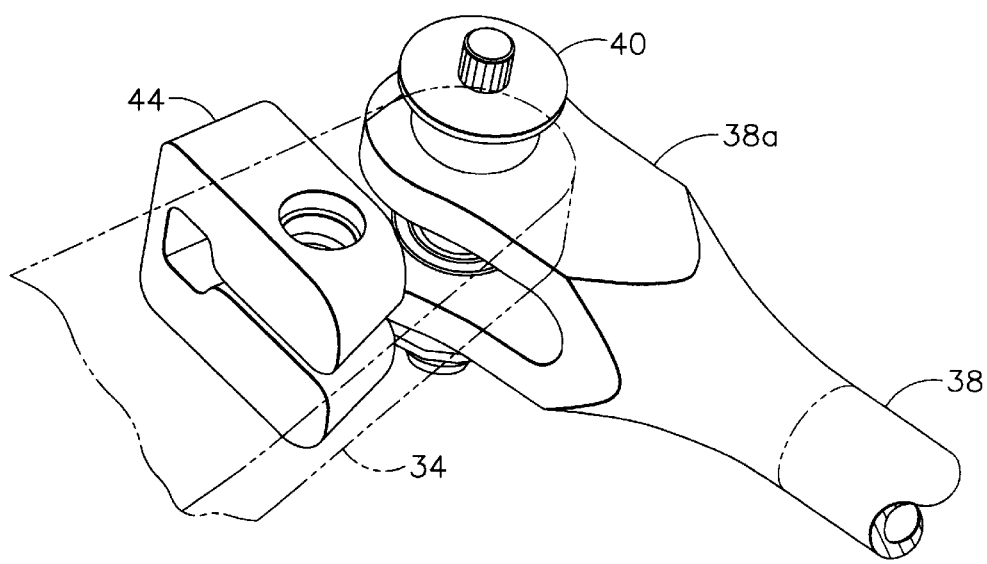
FIG. 6 is an enlarged view of the outer end of one of the thrust links illustrated in FIG. 2 adjacent an elastomeric snubber mounted to one end of the equalizer lever.

The end clevises 28,30 are illustrated in FIG. 3 without the equalizer lever and thrust links therein. FIG. 4 illustrates the center joint 42 between the lever and center clevis 32 in more detail. And, FIG. 5 illustrates an exemplary one of the failsafe joints 40 which join the thrust links to the equalizer lever 34 inside the corresponding end clevises 28,30.

The center joint 42 illustrated in FIG. 4 provides a small tolerance pivoting joint which permits the lever 34 to pivot slightly within the center clevis for equalizing thrust loads carried by the two thrust links 36,38 from the fan frame 16 to the platform 26 and in turn to the pylon 12. The normal thrust loadpath carries all the thrust load through the center joint 42 of the platform 26.

Figure 5:
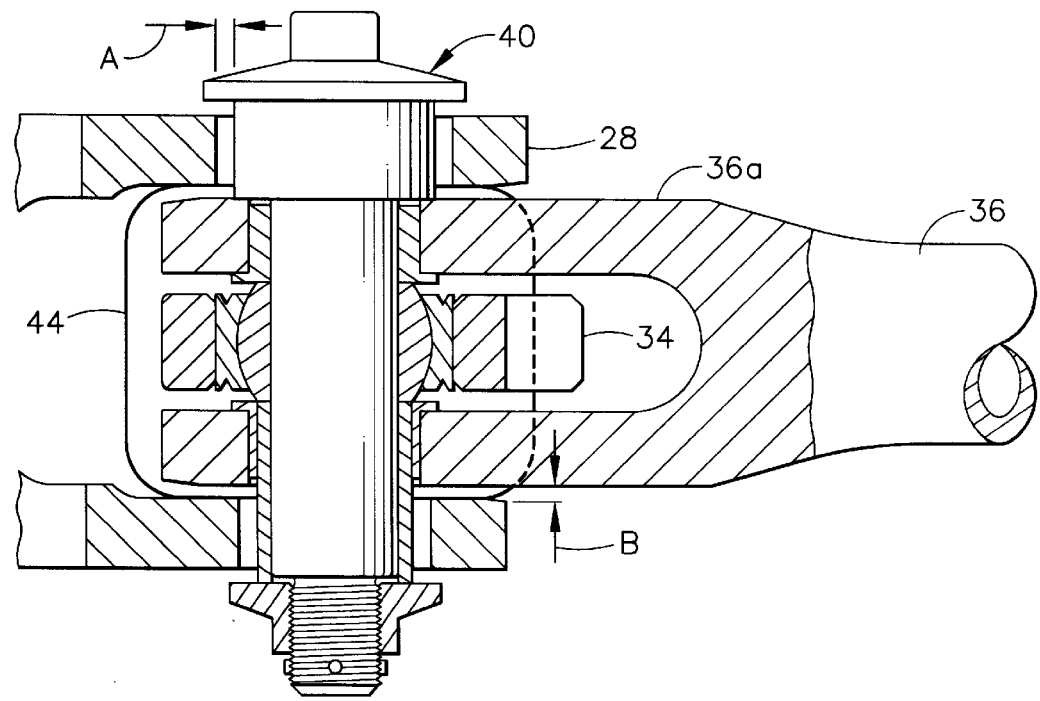
FIG. 5 is sectional view of the outer end of a thrust link joined to an equalizer lever inside a platform clevis as illustrated in FIG. 2 and taken along line 5—5.

As shown in FIG. 5, the thrust links are joined to the ends of the lever 34 using conventional spherical bearings or uniballs through which are mounted respective failsafe pins of the joints 40. The pins permit the thrust loads to be directly carried between the thrust links and the corresponding ends of the equalizer lever 34. The top and bottom ends of the pin illustrated in FIG. 5 are mounted within enlarged clearance holes in the end clevis 28, and also clevis 30, to provide a radial clearance A for permitting limited pivoting movement of the lever 34 without the pins engaging the respective clevises.

In the event of structural failure of the equalizer lever 34 between its two ends, an alternate or failsafe loadpath from the respective thrust links to the end clevises 28,30 is provided when movement of the end pins exceeds the available clearance within the clevis holes and abuts one or both end clevises 28,30 and short circuits the center clevis 32.

As illustrated in FIG. 5, the radial or failsafe clearance A is specifically introduced for permitting limited rotational movement of the equalizer lever 34 during normal operation. Furthermore, due to manufacturing tolerances, each side of the outer clevises of the thrust links has a transverse side clearance B with the opposing inner surface of the end clevis, which side clearance B is about 2.0 mm (80 mils). The failsafe joints 40 therefore are subject to limited movement within the available radial and side clearances A,B during normal operation.

Referring again to FIG. 2, the equalizer lever 34 in accordance with one embodiment of the present invention is substantially longer than the lever in the above identified patent due to the design constraints of mounting a different form of turbofan engine. The longer lever is thusly slender and flexible when designed for having minimum weight for carrying expected loads during operation. The longer and thusly more flexible equalizer lever correspondingly has lower resonant frequencies than the previous shorter and stiffer equalizer lever. The lower resonant frequencies have reduced margins of operation with the 1/rev operational speeds of the engine and are therefore subject to resonant excitation which can lead to undesirable HCF damage, joint wear, or vibratory impact damage.

In accordance with the present invention, a pair of substantially identical elastomeric snubbers 44 are disposed adjacent respective ends of the lever 34 inside respective ones of the end clevises 28,30 in frictional abutment therebetween. The respective end clevises 28,30 are suitably modified in accordance with the present invention for receiving not only the respective ends of the thrust links 36,38 for conventional failsafe operation, but also respective portions of the equalizer lever 34 for cooperating with the corresponding snubbers 44 at each end of the lever for accommodating the increased flexibility of the long lever 34.

For the long and slender equalizer lever 34 having increased flexibility over a short and rigid lever, the introduction of the end snubbers 44 provides elastic restraint inside the end clevises 28,30 which eliminates free or unrestrained vibratory motion of the lever ends irrespective of any 1/rev excitation of the lever.

Figure 7:
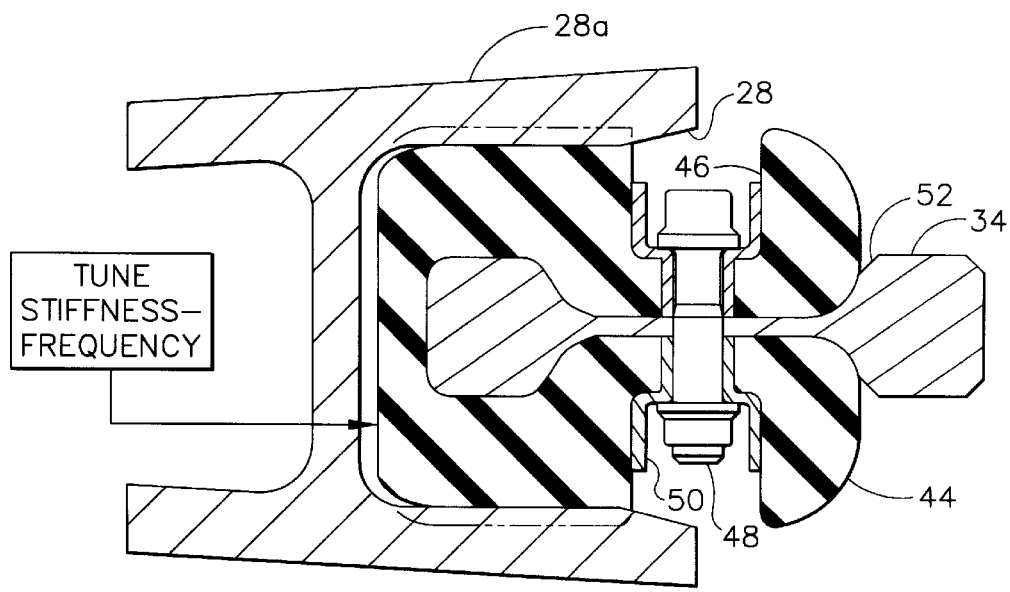
FIG. 7 is a sectional view through the left-end snubber, equalizer lever, and platform clevis illustrated in FIG. 2 and taken along line 7—7.

As shown in FIGS. 5 and 7, the snubbers 44 are sized to fit inside the respective end clevises 28,30 in frictional abutment therein. For example, the snubbers may initially be slightly larger in thickness than the available space inside the clevises, as shown in phantom line in FIG. 7, so that the snubbers may be initially compressed during installation for insertion into the clevises in an interference fit.

The installed snubbers thusly secure the opposite ends of the lever 34 in a vertically centered position between the opposing faces of the clevises for maintaining substantially equal side clearances B as illustrated in FIG. 5. Any vibratory movement of the lever 34 during operation in the normal or transverse direction to the sides of the lever is restrained by the snubbers for preventing reduction in the side clearance B which would otherwise lead to metal-to-metal contact between the ends of the thrust links and the failsafe clevises 28,30.

As initially shown in FIG. 2, the snubbers 44 are preferably laterally spaced from respective ones of the link outer ends 36a,38a inside the respective end clevises 28,30. The snubbers may therefore be mounted either inboard of the respective thrust links closer to the center clevis 32, or outboard of the thrust links further away from the center clevis.

In the preferred embodiment illustrated in FIG. 2, the end clevises 28,30 are preferably inclined or angled laterally outboard from the center of the platform to spread the end clevises outwardly to engage the respective thrust links and overlap the lever 34 at least in part laterally inboard of the respective lever outer ends 34a,b. The majority of the end clevises themselves is used to receive the respective ends of the lever and thrust links to define the failsafe joints 40, with the angled portion of the clevises defining respective overlaps 28a,30a over respective portions of the lever directly inboard from the thrust links ends. The snubbers 44 may then be conveniently disposed inboard of the lever outer ends in abutting engagement with respective ones of the clevis overlaps 28a,30a.

In this way, the end clevises have a preferred inclined orientation from the center of the platform for providing the alternate, failsafe loadpath from the respective thrust links when required, yet provide the additional function of supporting the respective snubbers during normal operation for frictionally restraining any vibratory movement of the equalizer lever. The equalizer lever may therefore be made substantially longer than the previous design, as well as relatively light weight and flexible, with vibratory response being limited and controlled by the introduction of the so-placed snubbers.

As shown in FIGS. 2 and 7, the snubbers 44 are preferably fixedly attached to the respective ends of the lever 34 itself, and frictionally abut the clevis overlaps 28a,30a. This permits the snubbers to be initially preassembled to the lever 34 prior to being assembled into the clevises of the platform. Alternatively, the snubbers could be fixedly mounted inside the end clevises of the platform, if desired.

Since the thrust links are mounted to the lever 34 the side clearances B on both sides thereof as illustrated in FIG. 5, each of the snubbers 44 preferably surrounds the lever on opposite sides thereof to frictionally abut the opposite overlap faces of the end clevises for centering the lever and minimizing vibratory reduction in size of the side clearances during operation.

As shown in FIG. 7, each of the snubbers 44 preferably wraps around the outer edge of the lever 34 hidden inside the end clevises, preferably in a general C-shape. This permits the lever and preinstalled snubbers to be pushed into the respective end clevises during assembly for automatically compressing the snubbers in an interference fit inside the clevises while maintaining continuity and location of the snubbers. The end ligament of the snubbers which joins their respective opposite side portions along the edge of the lever maintain structural integrity of the snubbers so that they may be readily inserted in a compression fit in the clevises without separation of the two sides of the snubber.

The snubbers may be suitably joined to the lever in various manners. In the preferred embodiment illustrated in FIG. 7, each of the snubbers includes a pair of axially aligned counterbores 46 through the opposite sides thereof which receive a corresponding fastener 48 in the form of a bolt and nut for clamping the individual snubbers in compression at the respective ends of the lever.

Since the snubbers are preferably elastomeric they are elastic or resilient, and the counterbores preferably include complementary metal bushings 50 which receive the fasteners for abutting the lever to limit compression of the snubbers thereat. In this way, the bushings and fasteners may be recessed inside the counterbores 46 for hiding the fasteners therein, and tightening of the fastener 48 places the snubber in compression thereat, which compression is limited by the height of the provided bushings.

The snubbers are thusly securely clamped to the lever with a relatively large area compression contact therewith, with the compression load being limited by the bushings to prevent excessive installation or operational stress on the snubbers themselves. The two opposite sides of the snubbers have a continuous surface area suitably sized to frictionally abut the corresponding two clevis overlaps 28a,30a for restraining vibratory motion of the lever as the particular design warrants.

However, the size of the snubbers is preferably as small as possible for minimizing weight of the snubbers and minimizing the corresponding clevis overlaps 28a,30a therefor for minimizing overall weight of the thrust mount itself while suitably restraining vibratory motion of the relatively flexible equalizer lever when made relatively long.

As initially shown in FIG. 2, the equalizer lever 34 is preferably formed as a long beam including pockets 52 defined by corresponding ribs and edges of the lever for providing substantial structural rigidity in the plane of the thrust links for carrying the substantial thrust forces between the fan frame 16 and the pylon 12 through the supporting platform 26. However, the lever 34 is relatively thin, and therefore relatively flexible in the direction normal or perpendicular to the sides of the lever for which the snubbers 44 are introduced to restrain vibratory movement thereof within the end clevises.

As shown in FIG. 7, the snubbers 44 are therefore preferably configured to complement the lever at the respective pockets in which the snubbers may be molded to fit for maximizing the contact surface area between the snubbers and the lever along the two opposite sides thereof in respective pockets and along the hidden edge of the lever within the C-shaped snubbers. In this way, maximum surface area contact may be provided on the inside of the snubbers where they frictionally abut the outer surface of the lever, and on the outside of the snubbers where they frictionally abut the inside of the end clevises.

As indicated above, the snubbers 44 are preferably made of an elastomeric material, such as fluorosilicone, which has a corresponding spring rate or elasticity, alternatively referred to as stiffness. Elastomeric materials may be conventionally modified to vary their effective spring rates, which spring rate in accordance with a preferred embodiment of the invention is selected to effect a resonant frequency of the lever different than the 1/rev operating speeds of the gas turbine engine. In this way, the thrust mount 24 may be tuned in a method which varies stiffness of the snubbers themselves to tune the resonant frequencies of the lever to maximize the margins with the 1/rev operating speeds of the engine.

Resonant or natural frequencies of a system having mass and elasticity or spring rate is controlled by the magnitude of the mass and spring rate. For example, the equalizer lever 34 itself has one spring rate in the plane of the thrust links and is relatively rigid for carrying the substantial thrust loads to the platform during operation. However, the lever is relatively flexible perpendicular to that thrust-plane and therefore has different resonant frequencies for the corresponding two modes of vibratory motion thereof.

By introducing the elastomeric snubbers 44 between the lever and the restraining end clevises 28,30, the effective transverse spring rate of the lever may be changed, and thusly its resonant frequency may also be changed. In this way, the snubbers may be used to tune the vibratory response of the lever for increasing 1/rev operating margins and minimizing resonant vibration.

Furthermore, the elastomeric snubbers 44 have inherent damping capability and are thusly effective for damping any vibratory motion of the equalizer lever during operation.

Accordingly, by the selective introduction of the relatively small snubbers 44 in the thrust mount 24, vibratory motion of the relatively long and transversely flexible equalizer lever 34 may be controlled without otherwise increasing the size and weight of the mount elements including the lever itself. The end clevises 28,30 are preferentially angled outwardly from the platform to provide the overlapping portions of the clevises in which the snubbers are restrained in frictional abutment therein. The resulting thrust mount is relatively compact notwithstanding the increased width required for accommodating the longer equalizer lever 34. The equalizer lever 34 is selectively rigid and strong in the plane of the thrust links for carrying the substantial thrust loads, yet may be relatively flexible perpendicularly thereto for which the snubbers accommodate any resulting vibratory movement within the end clevises.

An additional advantage of the thrust mount 24 is its ability to be further combined with the aft mount 22 as initially illustrated in FIGS. 1 and 2 for further effecting a compact configuration of the mounting system.

FIG. 3 illustrates in more detail the aft mount 22 in accordance with a conventional embodiment. The aft mount 22 includes a pair of active links 54,56 pivotally joined at opposite ends between the rear frame 18 and the common platform 26 for carrying vertical and horizontal loads therebetween. A center link or lug 58 is disposed between the two links for providing an alternate or failsafe loadpath in the event of damage to either link 54,56.

The center link 58 is illustrated in more detail in FIG. 4 and is pivotally joined at its inner end to the rear frame 18 and is pivotally joined as its outer end through an enlarged seat formed in the platform which initially carries no load during normal operation of the mount. Only upon failure of one of the two links 54,56 will the outer end of the center link 58 engage its seat for effecting the alternate failsafe loadpath to the platform. The aft mount 22 may take any suitable form such as that described in the above identified patent.

The preferred embodiment of the snubbers 44 described above provides amplitude control or snubbing of the vibratory movement of the equalizer lever 34 and eliminates metal-to-metal contact at the side clearances B between the lever and clevises. The snubbers provide inherent damping which may be varied by varying the material composition of the snubbers. And, the material composition of the snubbers may also be used for frequency tuning vibratory response of the equalizer lever for maximizing the margin between resonant frequencies and the 1/rev operating speeds of the engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A thrust mount for supporting a gas turbine engine to a pylon of an aircraft, comprising:
   a platform fixedly mountable to said pylon, and including first and second laterally spaced apart end clevises, and a center clevis therebetween;
   an equalizer lever including first and second opposite ends, and a center therebetween pivotally joined to said center clevis;
   first and second thrust links pivotally joined at outer ends to respective ones of said lever ends, and having inner ends for being pivotally mounted to said engine; and
   a pair of elastomeric snubbers disposed adjacent respective ends of said lever inside said end clevises in frictional abutment therebetween.

2. A mount according to claim 1 wherein said snubbers are laterally spaced from said link outer ends inside said end clevises.

3. A mount according to claim 2 wherein said end clevises are inclined laterally outboard from each other to overlap said lever in part laterally inboard of said respective lever outer ends, and said snubbers are disposed inboard thereof in abutting engagement with respective ones of said clevis overlap.

4. A mount according to claim 3 wherein said snubbers are fixedly attached to said lever, and frictionally abut said clevis overlaps.

5. A mount according to claim 4 wherein each of said snubbers surrounds said lever on opposite sides thereof to frictionally abut opposite faces of said end clevises.

6. A mount according to claim 5 wherein each of said snubbers wraps around an edge of said lever inside said end clevises.

7. A mount according to claim 5 wherein each of said snubbers includes counterbores in opposite sides thereof receiving a fastener for clamping said snubbers in compression on said lever.

8. A mount according to claim 7 wherein said snubber counterbores include bushings receiving said fasteners for abutting said lever to limit compression of said snubbers thereat.

9. A mount according to claim 5 wherein said lever further includes pockets defined by ribs, and said snubbers are configured to complement said lever at respective pockets.

10. A mount according to claim 5 wherein said snubbers comprise elastomeric material having a spring rate selected to effect a resonant frequency of said lever different than 1/rev operating speeds of said engine.

11. A method for tuning said thrust mount according to claim 5 comprising varying stiffness of said snubbers to effect a resonant frequency of said lever different than 1/rev operating speeds of said engine.

12. A thrust mount for supporting a gas turbine engine to a pylon of an aircraft, comprising:
   a platform fixedly mountable to said pylon, and including first and second laterally spaced apart end clevises, and a center clevis therebetween;
   an equalizer lever including first and second opposite ends, and a center therebetween pivotally joined to said center clevis;
   first and second thrust links pivotally joined at outer ends to respective ones of said lever ends, and having inner ends for being pivotally mounted to said engine;
   a pair of elastomeric snubbers disposed adjacent respective ends of said lever inside said end clevises in frictional abutment therebetween; and
   each of said snubbers surrounds said lever on opposite sides thereof to frictionally abut opposite faces of said end clevises.

13. A mount according to claim 12 wherein each of said snubbers includes counterbores in opposite sides thereof receiving a fastener for clamping said snubbers in compression on said lever.

14. A mounting according to claim 13 wherein said snubber counterbores include bushings receiving said fasteners for abutting said lever to limit compression of said snubbers thereat.

15. A mount according to claim 14 herein said lever further includes pockets defined by ribs, and said snubbers are configured to complement said lever at respective pockets.

16. A mount according to claim 15 wherein said end clevises are inclined laterally outboard from each other to overlap said lever in part laterally inboard of said respective lever outer ends, and said snubbers are disposed inboard thereof in abutting engagement with respective ones of said clevis overlap.

17. A mount according to claim 16 wherein each of said snubbers wraps around an edge of said lever inside said end clevises.

18. A whiffle tree lever for equalizing thrust loads in a thrust mount supporting a gas turbine engine to an aircraft pylon comprising:

first and second opposite ends for being pivotally joined to respective thrust links attached to said engine;

a center disposed between said lever ends for being pivotally joined to a platform mounted from said pylon; and a pair of elastomeric snubbers disposed adjacent respective ones of said lever ends for frictionally engaging respective end clevises of said platform.

19. A lever according to claim 18 wherein:

each of said snubbers surrounds said lever on opposite sides thereof to frictionally abut opposite faces of said end clevises; and each of said snubbers wraps around an edge of said lever inside said end clevises.

20. A lever according to claim 19 wherein:

each of said snubbers includes counterbores in opposite sides thereof receiving a fastener for clamping said snubbers in compression on said lever; and said snubber counterbores include bushings receiving said fasteners for abutting said lever to limit compression of said snubbers thereat.

* * * * *